United States Patent
Milomo et al.

(10) Patent No.: US 7,625,431 B2
(45) Date of Patent: Dec. 1, 2009

(54) AIR DRYERS

(75) Inventors: Ignitius Milomo, Leeds (GB); John Ellis, Leeds (GB)

(73) Assignee: Wabco Automotive UK Limited, Morley, Leeds, West Yorkshire (GB)

( * ) Notice: Subject to any disclaimer, the term of this patent is extended or adjusted under 35 U.S.C. 154(b) by 238 days.

(21) Appl. No.: 10/582,857

(22) PCT Filed: May 6, 2005

(86) PCT No.: PCT/GB2005/001744

§ 371 (c)(1),
(2), (4) Date: Nov. 13, 2007

(87) PCT Pub. No.: WO2005/113309

PCT Pub. Date: Dec. 1, 2005

(65) Prior Publication Data

US 2008/0134650 A1    Jun. 12, 2008

(30) Foreign Application Priority Data

May 21, 2004 (GB) .................. 0411436.9

(51) Int. Cl.
*B01D 53/04* (2006.01)
(52) U.S. Cl. .................. 95/147; 55/DIG. 17
(58) Field of Classification Search .......... 96/108, 96/147, 151; 55/DIG. 17, 490; 34/80
See application file for complete search history.

(56) References Cited

U.S. PATENT DOCUMENTS

| | | | | |
|---|---|---|---|---|
| 3,464,186 A * | 9/1969 | Hankinson et al. | ............ | 96/115 |
| 4,572,725 A * | 2/1986 | Kojima | ......................... | 96/137 |
| 5,110,327 A | 5/1992 | Smith | | |
| 5,286,283 A * | 2/1994 | Goodell | ......................... | 96/113 |
| 5,522,150 A * | 6/1996 | Schultz | .......................... | 34/80 |
| 5,607,500 A | 3/1997 | Shamine et al. | | |
| 5,622,544 A | 4/1997 | Shamine et al. | | |
| 5,792,245 A * | 8/1998 | Unger et al. | ................... | 96/137 |
| 6,558,457 B1 * | 5/2003 | Kolczyk | ........................ | 96/134 |
| 6,878,194 B2 * | 4/2005 | Hoffman et al. | .............. | 96/147 |
| 2003/0138333 A1 | 7/2003 | Nakazawa | | |
| 2007/0144350 A1 * | 6/2007 | Paling | .......................... | 96/134 |

FOREIGN PATENT DOCUMENTS

EP    0 875 432 A2    11/1998
EP    0 875 432 A3    11/1998

OTHER PUBLICATIONS

Written Opinion of the International Searching Authority for PCT/GB2005/001744 dated Aug. 29, 2005.
International Search Report for PCT/GB2005/001744 Dated Aug. 29, 2005.

* cited by examiner

*Primary Examiner*—Frank M Lawrence
(74) *Attorney, Agent, or Firm*—Nixon Peabody LLP; Jeffrey L. Costellia

(57) ABSTRACT

An air dryer for an air braking system of a vehicle, the air dryer comprising a mounting (20), and a removable desiccant canister (10) screw-threaded to said mounting (20) about a spin axis (25) and having a peripheral sealing ring (13,14), wherein the mounting includes an upstanding protrusion (28) radially spaced from said axis (25) and adapted to engage an annular recess (17) of said canister (10) within said ring, said protrusion (28) being hollow, and the interior of said protrusion (28) being connected to a vent for air under pressure in the system.

7 Claims, 1 Drawing Sheet

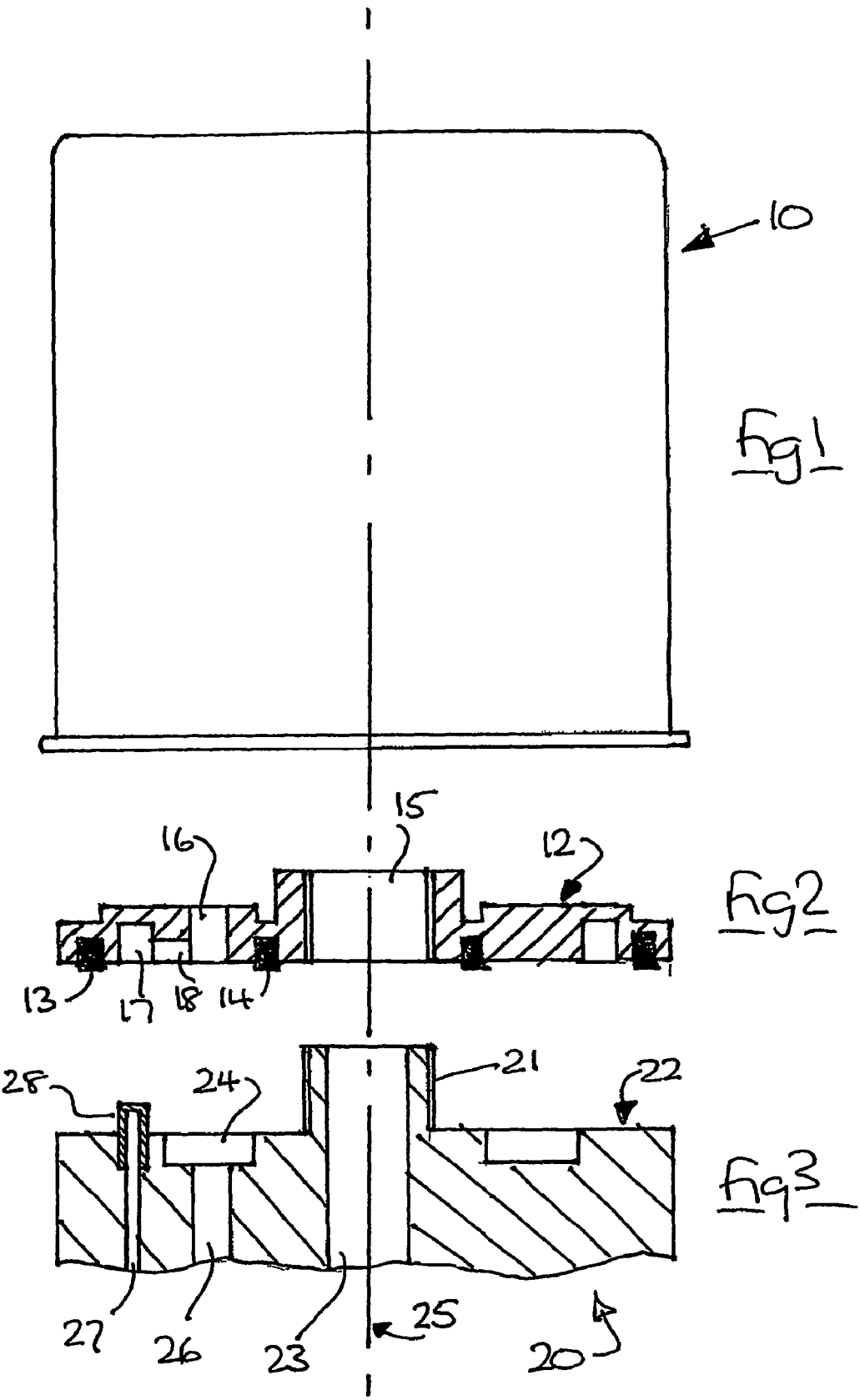

AIR DRYERS

This invention relates to air dryers for the braking systems of heavy commercial vehicles.

Commercial vehicles, such as large trucks, buses and the like, generally use compressed air as a medium for actuating the wheel brakes. An engine driven compressor provides air under pressure to a reservoir, from which it is directed to wheel brake actuators via a driver actuated foot valve. In order to avoid moisture in the braking system, which may cause corrosion, an air dryer is usually provided upstream of the reservoir.

The typical air dryer comprises a canister of desiccant downstream of the compressor, and through which compressed air is directed to the reservoir. Gradually the desiccant becomes loaded with moisture, and it is periodically regenerated by expanding a small volume of compressed dry air through the canister in reverse. Replaceable canisters are preferred in order to permit substitution of desiccant at the recommended service interval.

The specified volume of desiccant is somewhat dependent on the ambient moisture content of air, and the rate of air consumption of the vehicle. Accordingly a range of desiccant canisters of different volume may be provided, from which the vehicle manufacturer will select the most appropriate for the conditions of use. Furthermore, the desiccant canister may include a special feature, such as an oil trap.

However for reasons of economy and interchangeability, the manufacturers may wish to utilize a generally common mounting for the desiccant canister, and the problem arises of how to ensure that the correct canister is fitted to the vehicle, especially at the time of service exchange.

It is known to provide a special mating arrangement to ensure fitment of appropriate components, typically by suitable plug and socket connection. However this arrangement may be unsuitable if removal of a male feature permits a female feature to nevertheless adopt the intended location.

Thus a conventional screw on desiccant canister has a central screw thread. If an upstanding post is provided on the mounting side at a distance from the screw thread, it will prevent attachment of a canister unless it also has a annular recess corresponding to the post. Nevertheless removal of the post, for example by sawing it off, may permit any canister to be attached.

What is required is a simple mechanical device capable to adaptation to a common mounting body, and which indicates incorrect assembly.

According to the invention, there is provided an air dryer for an air braking system of a vehicle, the air dryer comprising a mounting, and a removable desiccant canister screw-threaded to said mounting about a spin axis and having a peripheral sealing ring, wherein the mounting includes an upstanding protrusion radially spaced from said axis and adapted to engage an annular recess of said canister within said ring, said protrusion being hollow, and the interior of said protrusion being connected to a vent for air under pressure in the system.

In such an arrangement, the protrusion and recess co-operate to ensure mating of a correct canister. Any removal of the protrusion exposes the interior space to air under pressure within the canister, which can be directed to vent directly, or to actuate a vent valve of the system. In either case air under pressure will escape from the system and make a noise. Furthermore the escape may prevent a build-up of pressure in the braking system.

In a preferred embodiment the mounting includes a vent passage closed at one end by said protrusion and open at the other end to atmosphere. The protrusion may consist of a cylindrical pin having a blind bore and adapted to be pressed into a counterbore of said vent passage.

In the alternative the vent passage may open at the other end into an actuation chamber of a vent valve of the braking system. In this embodiment, air pressure in the vent passage acts as a pilot signal for the vent valve, which may for example be in the form of a piston.

The vent valve may for example be a drain valve adapted to be opened to exhaust the air braking system, or the usual regeneration valve which isolates the compressor whilst connecting the air dryer inlet to atmosphere.

Other features of the invention will be apparent from the following description of a preferred embodiment illustrated by way of reference only in the accompanying drawings in which:

FIG. 1 is an elevation of a conventional cylindrical desiccant canister;

FIG. 2 is an axial section through a canister end plate for the invention, and

FIG. 3 is a partial axial section through a canister mounting of the invention.

With reference to the drawings, FIG. 1 illustrates a conventional replaceable desiccant canister 10. The internal structure of the canister is not important, but a flow path is defined from an inlet to an outlet by an internal partition and end plate 12 (FIG. 2).

FIG. 3 illustrates part of a valve body 20 which includes a mounting for the canister 10 comprising a hollow male screw thread 21.

The mounting 20 includes a generally flat annular face 22 from which the male thread 21 projects to define an outlet passage 23. An annular recess 24 co-axial about the thread axis 25 is connected to an inlet passage 26. A pressure vent passage 27 is closed at the face 22 by an upstanding cylindrical plug 28 having a blind internal bore, and which is pressed into a counterbore of the passage 27 as illustrated.

The end plate 12 includes a central female threaded hole, and is the means by which the canister spins onto the mounting 20 about axis 25.

Co-axial annular grooves retain sealing rings 13,14 which compress to seal the inlet passage 26 from the outlet passage 23, and the inlet passage 26 from the exterior. The canister outlet 15 is defined by the threaded hole, and the inlet by one or more through passages 16 adapted to align with the recess 24.

Another co-axial groove 17 is aligned with the plug 28, as illustrated, and is connected to the inlet passage 16 by a relief groove 18.

It should be understood that the figures are somewhat schematic, and certain dimensions and shapes are exaggerated in order to best illustrate the invention.

In use the canister 10 is spun fully onto the mounting 20, and the sealing rings 13,14 ensure leaktight connection. Compressed air is passed through the desiccant, and thereby dried, and periodically dry air is used to regenerate the desiccant. This reverse flow passes to atmosphere through a conventional valve, which is not shown.

Replacement of the canister 10 requires simple unscrewing of the used component, and attachment of a new one.

The groove 17 provides an identifying feature for the correct replacement. If the groove 17 is not present, the plug 28 will prevent complete screwing-on of the canister, and the inlet passage 26 will not be sealed. Accordingly the braking system will not pressurize and the usual warning buzzer will sound in the drivers cab. Additionally the operator will be alerted by the sound of a large air leak in the vicinity of the cartridge.

If the operator attempts to remove the plug 28, the canister will screw on fully, but the inlet passage 16 will connect to the vent passage 27 via the relief groove 18.

The vent passage 27 may be connected to atmosphere, and accordingly the braking system will not pressurize sufficiently or at all, and as noted above, the buzzer will sound, and an air leak will be apparent. The vent passage 27 may be directed to a whistle or the like.

Alternatively, the vent passage 27 may be connected to operate the usual regeneration valve, or to a drain valve whereby a piston moves to open the inlet passage 26 to atmosphere.

Thus the upstanding plug 28 provides an obstruction to attachment of an incorrect canister, and a fail-safe indicator in the event of tampering.

The illustrated embodiment is schematic, and many kinds of upstanding plugs are possible. Such a plug may be threaded, or formed integrally with the mounting 20. By adjusting the radius of the plug, or by providing several such plugs, it is possible to customize a common mounting to several sizes or kinds of desiccant canister.

The invention claimed is:

1. An air dryer for an air braking system of a vehicle, the air dryer comprising a mounting, and a removable desiccant canister screw-threaded to said mounting about a spin axis and having a peripheral sealing ring, wherein the mounting includes an upstanding protrusion radially spaced from said axis and adapted to engage an annular recess of said canister within said ring, said protrusion being hollow, and the interior of said protrusion being connected to a vent for air under pressure in the system.

2. An air dryer as claimed in claim 1 wherein the mounting includes a vent passage closed at one end by said protrusion and open at the other end to atmosphere.

3. An air dryer as claimed in claim 1 or claim 2 wherein the protrusion consists of a cylindrical pin having a blind bore and adapted to be pressed into a counterbore of said vent passage.

4. An air dryer as claimed in claim 2 wherein the vent passage opens at the other end into an actuation chamber of a vent valve of the braking system.

5. An air dryer as claimed in claim 4 wherein air pressure in the vent passage acts as a pilot signal for the vent valve.

6. An air dryer as claimed in claim 4 or claim 5 wherein the vent valve is a drain valve adapted to be opened to exhaust the air braking system.

7. An air dryer as claimed in claim 4 or claim 5 wherein the vent valve is a regeneration valve which isolates a compressor whilst connecting the air dryer inlet to atmosphere.

* * * * *